United States Patent
Sedarat et al.

(10) Patent No.: US 9,590,695 B1
(45) Date of Patent: Mar. 7, 2017

(54) REJECTING RF INTERFERENCE IN COMMUNICATION SYSTEMS

(71) Applicant: Aquantia Corporation, Milpitas, CA (US)

(72) Inventors: Hossein Sedarat, San Jose, CA (US); Ramin Farjadrad, Los Altos, CA (US); Ramin Shirani, Morgan Hill, CA (US)

(73) Assignee: Aquantia Corp., Milpitas, CA (US)

( * ) Notice: Subject to any disclaimer, the term of this patent is extended or adjusted under 35 U.S.C. 154(b) by 8 days.

(21) Appl. No.: 13/965,635

(22) Filed: Aug. 13, 2013

Related U.S. Application Data

(63) Continuation of application No. 12/604,351, filed on Oct. 22, 2009, now Pat. No. 8,625,704, which is a continuation of application No. 12/551,210, filed on Aug. 31, 2009, now abandoned.

(60) Provisional application No. 61/153,440, filed on Feb. 18, 2009.

(51) Int. Cl.
*H04B 3/32* (2006.01)

(52) U.S. Cl.
CPC ...................... *H04B 3/32* (2013.01)

(58) Field of Classification Search
CPC ............... H01L 23/481; H01L 27/0694; H01L 2924/00; H04B 3/32
USPC .................. 375/316, 324; 370/201
See application file for complete search history.

(56) References Cited

U.S. PATENT DOCUMENTS

| | | |
|---|---|---|
| 3,506,906 A | 4/1970 | Nestor |
| 3,671,859 A | 6/1972 | Miller |
| 4,797,902 A | 1/1989 | Nishiguchi et al. |
| 4,870,370 A | 9/1989 | Hedberg et al. |
| 5,157,690 A | 10/1992 | Buttle |
| 5,283,811 A | 2/1994 | Chennakeshu et al. |
| 5,550,924 A | 8/1996 | Helf et al. |
| 5,777,692 A | 7/1998 | Ghosh |
| 5,832,032 A | 11/1998 | Overbury |
| 5,889,511 A | 3/1999 | Ong et al. |
| 5,910,960 A | 6/1999 | Claydon et al. |
| 5,995,566 A | 11/1999 | Rickard et al. |

(Continued)

FOREIGN PATENT DOCUMENTS

| WO | WO97/40587 | 10/1997 |
|---|---|---|

OTHER PUBLICATIONS

U.S. Appl. No. 12/563,938, filed Sep. 21, 2009, Sedarat.

(Continued)

*Primary Examiner* — Freshteh N Aghdam
(74) *Attorney, Agent, or Firm* — Lance M. Kreisman; Peninsula Patent Group

(57) ABSTRACT

Rejecting radio frequency (RF) interference in a communication system. In one aspect, rejecting RF interference includes receiving a signal on a signal path of a receiver from a communication channel, the signal including one or more received signal components having a frequency within a predetermined subset range of frequencies within an operating signal bandwidth of the receiver. The received signal components are attenuated using a notch filter to reduce RF interference obtained during transmission of the signal over the communication channel. In some embodiments, the one or more signal components have been boosted in power at a link partner transmitter connected to the communication channel.

9 Claims, 7 Drawing Sheets

(56) References Cited

U.S. PATENT DOCUMENTS

| | | | |
|---|---|---|---|
| 5,995,567 A | 11/1999 | Cioffi et al. | |
| 6,011,508 A | 1/2000 | Perreault et al. | |
| 6,035,360 A | 3/2000 | Doidge et al. | |
| 6,052,420 A | 4/2000 | Yeap et al. | |
| 6,069,917 A | 5/2000 | Werner et al. | |
| 6,181,777 B1* | 1/2001 | Kiko | 379/32.04 |
| 6,285,718 B1 | 9/2001 | Reuven | |
| 6,385,315 B1 | 5/2002 | Viadella et al. | |
| 6,424,234 B1 | 7/2002 | Stevenson | |
| 6,486,746 B1 | 11/2002 | Gilbert | |
| 6,683,913 B1 | 1/2004 | Kantschuk | |
| 6,690,739 B1 | 2/2004 | Mui | |
| 6,711,207 B1 | 3/2004 | Amrany et al. | |
| 6,734,659 B1 | 5/2004 | Fortner | |
| 6,771,720 B1 | 8/2004 | Yang et al. | |
| 6,924,724 B2 | 8/2005 | Grilo et al. | |
| 6,934,345 B2 | 8/2005 | Chu et al. | |
| 6,959,056 B2 | 10/2005 | Yeap et al. | |
| 6,999,504 B1 | 2/2006 | Amrany et al. | |
| 7,026,730 B1 | 4/2006 | Marshall et al. | |
| 7,031,402 B2 | 4/2006 | Takada | |
| 7,061,987 B1* | 6/2006 | Tan et al. | 375/260 |
| 7,103,013 B1 | 9/2006 | Kim et al. | |
| 7,123,117 B2 | 10/2006 | Chen et al. | |
| 7,164,764 B2 | 1/2007 | Zimmerman et al. | |
| 7,173,992 B2 | 2/2007 | Frigon | |
| 7,180,940 B2 | 2/2007 | Li et al. | |
| 7,200,180 B2 | 4/2007 | Verbin et al. | |
| 7,307,331 B2* | 12/2007 | Kipnis et al. | 257/499 |
| 7,315,592 B2 | 1/2008 | Tsatsanis et al. | |
| 7,333,603 B1 | 2/2008 | Sallaway et al. | |
| RE40,149 E | 3/2008 | Vitenberg | |
| 7,440,892 B2 | 10/2008 | Tamura | |
| 7,457,386 B1 | 11/2008 | Phanse | |
| 7,459,982 B2 | 12/2008 | Miao | |
| 7,492,840 B2 | 2/2009 | Chan | |
| 7,522,928 B2 | 4/2009 | O'Mahony | |
| 7,542,528 B1 | 6/2009 | Cheong | |
| 7,634,032 B2 | 12/2009 | Chu et al. | |
| 7,656,956 B2 | 2/2010 | King | |
| 7,706,434 B1 | 4/2010 | Farjadrad | |
| 7,708,595 B2 | 5/2010 | Chow et al. | |
| 8,094,546 B2 | 1/2012 | Schenk | |
| 8,139,602 B2 | 3/2012 | Meier | |
| 8,331,508 B2 | 12/2012 | Dabiri | |
| 8,472,532 B2 | 6/2013 | Schley-May et al. | |
| 8,625,704 B1 | 1/2014 | Sedarat et al. | |
| 2003/0077871 A1* | 4/2003 | Cheng et al. | 438/381 |
| 2003/0186591 A1 | 10/2003 | Jensen et al. | |
| 2003/0223488 A1 | 12/2003 | Li et al. | |
| 2003/0223505 A1 | 12/2003 | Verbin et al. | |
| 2004/0010203 A1 | 1/2004 | Bibian et al. | |
| 2004/0023631 A1 | 2/2004 | Deutsch et al. | |
| 2004/0164619 A1 | 8/2004 | Parker et al. | |
| 2004/0213366 A1 | 10/2004 | Ono | |
| 2004/0239465 A1 | 12/2004 | Chen et al. | |
| 2004/0252755 A1 | 12/2004 | Jaffe et al. | |
| 2004/0257743 A1 | 12/2004 | Chen et al. | |
| 2005/0018777 A1 | 1/2005 | Azadet | |
| 2005/0025266 A1 | 2/2005 | Chan | |
| 2005/0053229 A1 | 3/2005 | Tsatsanis et al. | |
| 2005/0097218 A1 | 5/2005 | Sultenfuss et al. | |
| 2005/0123081 A1 | 6/2005 | Shirani | |
| 2005/0135489 A1 | 6/2005 | Ho et al. | |
| 2005/0203744 A1 | 9/2005 | Tamura | |
| 2005/0243483 A1 | 11/2005 | Chen et al. | |
| 2006/0018388 A1 | 1/2006 | Chan | |
| 2006/0056503 A1 | 3/2006 | Keshab et al. | |
| 2006/0159186 A1 | 7/2006 | King | |
| 2006/0182014 A1 | 8/2006 | Lusky et al. | |
| 2006/0192653 A1* | 8/2006 | Atkinson et al. | 340/5.61 |
| 2006/0256880 A1 | 11/2006 | Frisch | |
| 2007/0014378 A1 | 1/2007 | Parhi et al. | |
| 2007/0081475 A1 | 4/2007 | Telado et al. | |
| 2007/0146011 A1 | 6/2007 | O'Mahony et al. | |
| 2007/0192505 A1 | 8/2007 | Dalmia | |
| 2007/0258517 A1 | 11/2007 | Rollings et al. | |
| 2007/0280388 A1 | 12/2007 | Torre et al. | |
| 2008/0089433 A1 | 4/2008 | Cho et al. | |
| 2008/0095283 A1 | 4/2008 | Shoor | |
| 2008/0107167 A1 | 5/2008 | Tung et al. | |
| 2008/0160915 A1 | 7/2008 | Sommer et al. | |
| 2008/0198909 A1 | 8/2008 | Tsatsanis et al. | |
| 2008/0267212 A1 | 10/2008 | Crawley et al. | |
| 2009/0061808 A1 | 3/2009 | Higgins | |
| 2009/0097401 A1 | 4/2009 | Diab | |
| 2009/0097539 A1 | 4/2009 | Furman | |
| 2009/0154455 A1 | 6/2009 | Diab | |
| 2009/0161781 A1 | 6/2009 | Kolze | |
| 2010/0046543 A1 | 2/2010 | Parnaby | |
| 2010/0073072 A1 | 3/2010 | Ullen et al. | |
| 2010/0074310 A1 | 3/2010 | Roo et al. | |
| 2010/0086019 A1 | 4/2010 | Agazzi et al. | |
| 2010/0111202 A1 | 5/2010 | Schley-May et al. | |
| 2010/0159866 A1 | 6/2010 | Fudge et al. | |
| 2011/0032048 A1 | 2/2011 | Wu et al. | |
| 2011/0069794 A1 | 3/2011 | Tavassoli Kilani et al. | |
| 2011/0106459 A1 | 5/2011 | Chris et al. | |
| 2011/0212692 A1 | 9/2011 | Hahn | |
| 2011/0256857 A1 | 10/2011 | Chen et al. | |
| 2011/0293041 A1 | 12/2011 | Luo et al. | |
| 2011/0296267 A1 | 12/2011 | Malkin et al. | |

OTHER PUBLICATIONS

U.S. Appl. No. 12/604,323, filed Oct. 22, 2009, Sedarat et al.
U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

REJECTING RF INTERFERENCE IN COMMUNICATION SYSTEMS

CROSS REFERENCE TO RELATED APPLICATIONS

This application is a continuation of U.S. patent application Ser. No. 12/604,351, filed Oct. 22, 2009, which is a continuation of U.S. patent application Ser. No. 12/551,210, filed Aug. 31, 2009, now abandoned.

This application claims the benefit of U.S. Provisional Application No. 61/153,440, filed Feb. 18, 2009.

This application is related to:

U.S. patent application Ser. No. 12/604,323, filed Oct. 22, 2009;

U.S. patent application Ser. No. 12/604,358, filed Oct. 22, 2009, now U.S. Pat. No. 8,320,411, issued Nov. 27, 2012;

U.S. patent application Ser. No. 12/604,343, filed Oct. 22, 2009, now U.S. Pat. No. 8,284,007, issued Oct. 9, 2012;

U.S. patent application Ser. No. 12/551,340, filed Aug. 31, 2009, now abandoned;

U.S. Provisional Application No. 61/141,640, filed Dec. 30, 2008;

U.S. Provisional Application No. 61/141,639, filed Dec. 30, 2008;

U.S. patent application Ser. No. 12/551,347, filed Aug. 31, 2009, now abandoned;

U.S. Provisional Application No. 61/148,112, filed Jan. 29, 2009;

U.S. patent application Ser. No. 12/563,938, filed Sep. 21, 2009;

U.S. patent application Ser. No. 12/551,396, filed Aug. 31, 2009;

U.S. Provisional Application No. 61/099,979, filed Sep. 25, 2008;

U.S. patent application Ser. No. 12/551,326, filed Aug. 31, 2009;

U.S. Provisional Application No. 61/173,394, filed Apr. 28, 2009;

all of which are incorporated herein by reference in their entireties.

FIELD OF THE INVENTION

The present invention relates generally to electronic communications, and more particularly to rejection of RF interference in the reception of signals over communication channels.

BACKGROUND OF THE INVENTION

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver.

In some communication systems known as wireline communication systems, the communicated data is encoded on a modulated signal which is typically transmitted differentially over a pair of wires. In such systems, the common-mode signal on the two wires does not carry any information and it is typically noise from electro-magnetic interference and crosstalk. In a perfect system, the common-mode signal is very well balanced and does not convert to a differential signal. However, in any practical system the transversal conversion loss (TCL) is finite which means some portion of the common-mode signal shows up as differential noise at the receiver input. The imbalance that would cause a finite TCL can be anywhere in the signal path including the wireline channel, the connectors at both end of the channel, and even the components that are used to detect the differential signal.

Examples of wireline communication systems that are susceptible to common-mode noise include various varieties of Digital Subscriber Line (DSL) and Ethernet over copper, such as 10GBASE-T allowing 10 gigabit/second connections over unshielded or shielded twisted pair cables. Although the information carrying signal of the system does not have a common-mode component, there are other sources that can induce a common-mode signal in the communication channel. One particularly important source of common-mode noise is radio frequency interference (RFI). The sources of RFI are abundant. Radio and TV stations, mobile phones and base stations, wireless network equipment, HAM transceivers, and walkie-talkies are examples of such sources. The noise from RFI may be a limiting factor in the performance of a wireline communication system.

Accordingly, what is needed are systems and methods that reject or reduce radio frequency (RF) interference in the performance of wireline communication systems, providing more robust communication in such systems.

SUMMARY OF THE INVENTION

A system and method for rejecting RF interference in communication systems is disclosed. In one aspect, a method for rejecting radio frequency (RF) interference includes receiving a signal on a signal path of a receiver from a communication channel connected to the signal path, the signal including one or more received signal components having a frequency within a predetermined subset range of frequencies within an operating signal bandwidth of the receiver. The one or more received signal components are attenuated using a notch filter to reduce RF interference obtained during transmission of the signal over the communication channel. In some embodiments, the one or more signal components have been boosted in power at a link partner transmitter connected to the communication channel.

In another aspect, a method for rejecting radio frequency (RF) interference in a communication system includes receiving a signal on a signal path of a receiver from a communication channel connected to the receiver, the received signal including one or more received signal components having a frequency outside an operating signal bandwidth of the receiver. The receiver is included in a transceiver that also includes a transmitter sending transmitted signals on the communication channel. The one or more received signal components are attenuated using a filter to reduce out-of-band RF interference obtained during transmission of the received signal over the communication channel, where the filter is connected to the signal path of the receiver and is not connected to a signal path of the transmitter.

In another aspect, a communication system for rejecting radio frequency (RF) interference includes a transmitter and a receiver. The transmitter includes a transmit signal path connected to a near end of a communication channel and transmitting a signal on the communication channel. The transmitter also includes a boost block in the transmit signal path, the boost block boosting power of one or more desired signal components of the signal transmitted on the communication channel in a predetermined subset range of frequencies within an operating signal bandwidth of the communication system. The receiver includes a receive signal path connected to a far end of the communication channel and receiving the signal from the channel, and a notch filter in the receive signal path. The notch filter is configured to attenuate all components of the received signal within the predetermined subset range of frequencies, where the attenuated components include the one or more desired signal components. The attenuating of all the components of the received signal reduces RF interference obtained in transmitting the signal over the communication channel The inventions disclosed herein allow RF interference to be rejected in channels of a communication system. Out-of-band and in-band interference can be rejected, allowing more accurate and robust communication of signals.

DETAILED DESCRIPTION OF PREFERRED EMBODIMENTS

The present invention relates generally to electronic communications, and more particularly to rejection of RF interference in the reception of signals over communication channels. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention describes systems and methods for rejecting or blocking RF interference in wireline communication systems. The inventions are described in the context of a 10GBASE-T communication system but are equally applicable to many other communication standards and systems. Furthermore, the present inventions are suitable for differential communication systems but also may be employed in other types of communication systems, such as single-ended communication systems.

RF interference often appears as common-mode voltage on a differential wireline communication channel. The common-mode to differential conversion gain of various sections of a wireline channel and signal path is practically non-zero. Because of this non-zero conversion gain, RF interference appears as differential noise at the receiver, which may limit the performance of the receiver. It is important to block the RFI from the signal path of the receiver in order to maintain the desired receiver performance. Thus, techniques for blocking in-band and out-of-band RFI sources are described herein.

Figure 1:
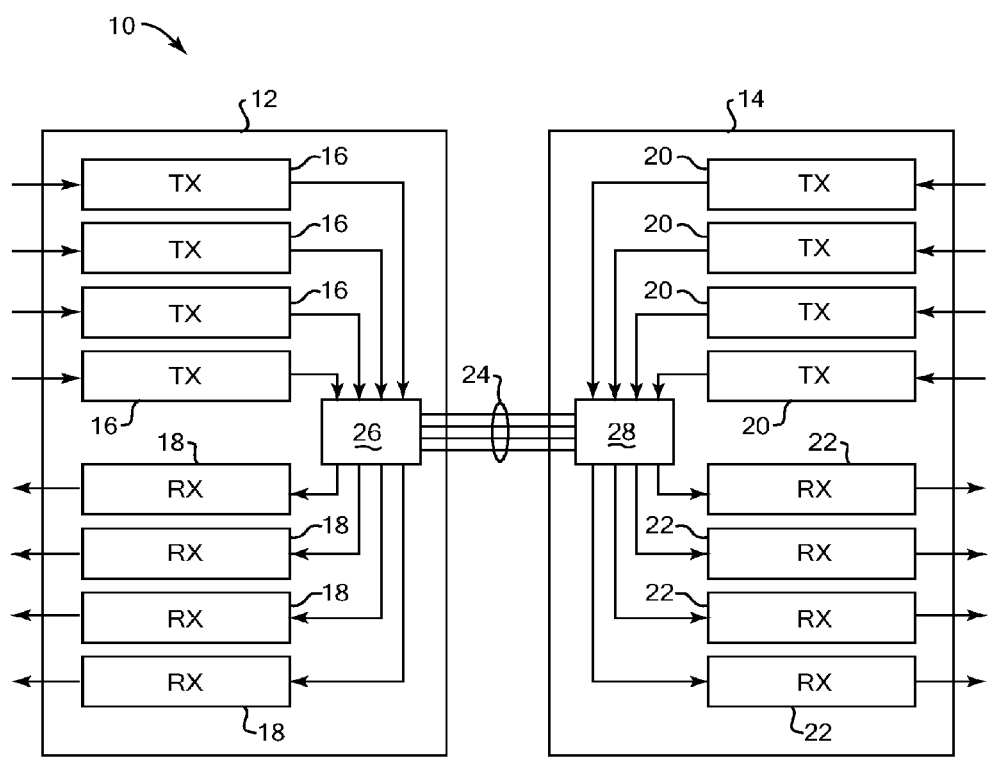
FIG. 1 is a block diagram illustrating a communication system suitable for use with the present invention.

FIG. 1 is a block diagram illustrating an example communication system 10 suitable for use with the present invention. System 10 includes a first transceiver 12 and a second transceiver 14 which can communicate with each other. Transceiver 12 includes "transceiver components" including one or more transmitters 16 and one or more receivers 18. Similarly, transceiver 14 includes transceiver components including one or more transmitters 20 and one or more receivers 22. The transmitters 16 (and 20) shown in FIG. 1 can be considered individual "transmitters," as typically referenced herein, or can be considered individual transmitter channels which a transmitter block within the transceiver can independently transmit signals on. Similarly, receivers 18 (and 22) can be considered individual "receivers," as typically referenced herein, or can alternately be considered individual receiver channels which a receiver block within the transceiver can independently receive signals on. The transmitters 16 and 20 and receivers 18 and 22 are connected to one or more components (not shown) of a computer system, device, processor, or other "controller" associated with each respective transceiver which want to communicate data over the communication network. For example, transmitters 16 receive data and control signals from the controller connected to transceiver 12 in order to send the data over the network to other transceivers and controllers, while receivers 18 receive data from other transceivers and controllers via the network in order to provide the data to the controller connected to first transceiver 12.

The transceiver 12 can communicate with the transceiver 14 over one or more communication channels of a communication link 24. For example, for the 10GBASE-T Ethernet standard, four communication channels are provided on link 24, each channel including a twisted pair cable. Thus, in that standard, there are four transmitters 16 and four corresponding receivers 18 provided in each of the transceivers 12 and 14, each transmitter associated with one of the local near-end receivers in the same transceiver, and each such transmitter/receiver pair dedicated to one channel used for duplex communication. A transmitter/receiver pair in one transceiver 12 communicates across a channel of link 24 to a far-end transmitter/receiver pair in transceiver 14. A transmitter 16 and a receiver 22 that are connected to the same channel/link, or two transceivers connected by the communication link 24, are considered "link partners."

An interface 26 can be provided in transceiver 12 and an interface 28 can be provided in transceiver 14 to allow data transmissions between the transceivers to be routed to the appropriate transceiver blocks. For example, interfaces 26 and 28 can include transformers to provide an open circuit inductance, and circuitry used for directing signals or data (alternatively, some or all circuitry can be included in other components, such as transmitters 16 and receivers 18).

In one example from the point of view of transceiver 12, data transmissions during normal operation from a local transmitter 16 are provided to the interface 26, which outputs the data on a corresponding channel of the communication link 24. The data is received by the link partner, the transceiver 14. The interface 28 of transceiver 14 provides the received data to its receiver 22 connected to that same channel. Furthermore, due to noise effects such as near-end crosstalk and echo, the data transmitted by transmitters 16 is also received by the near-end receivers 18 in the same transceiver. Filters can be used to filter out this noise so that the receivers 18 receive only data from other transceivers 14. In some embodiments, the transceivers 12 and 14 are asymmetric, such that data transmitted by a local transmitter has no dependence or relation with data being received by the corresponding local receiver.

Figure 2:
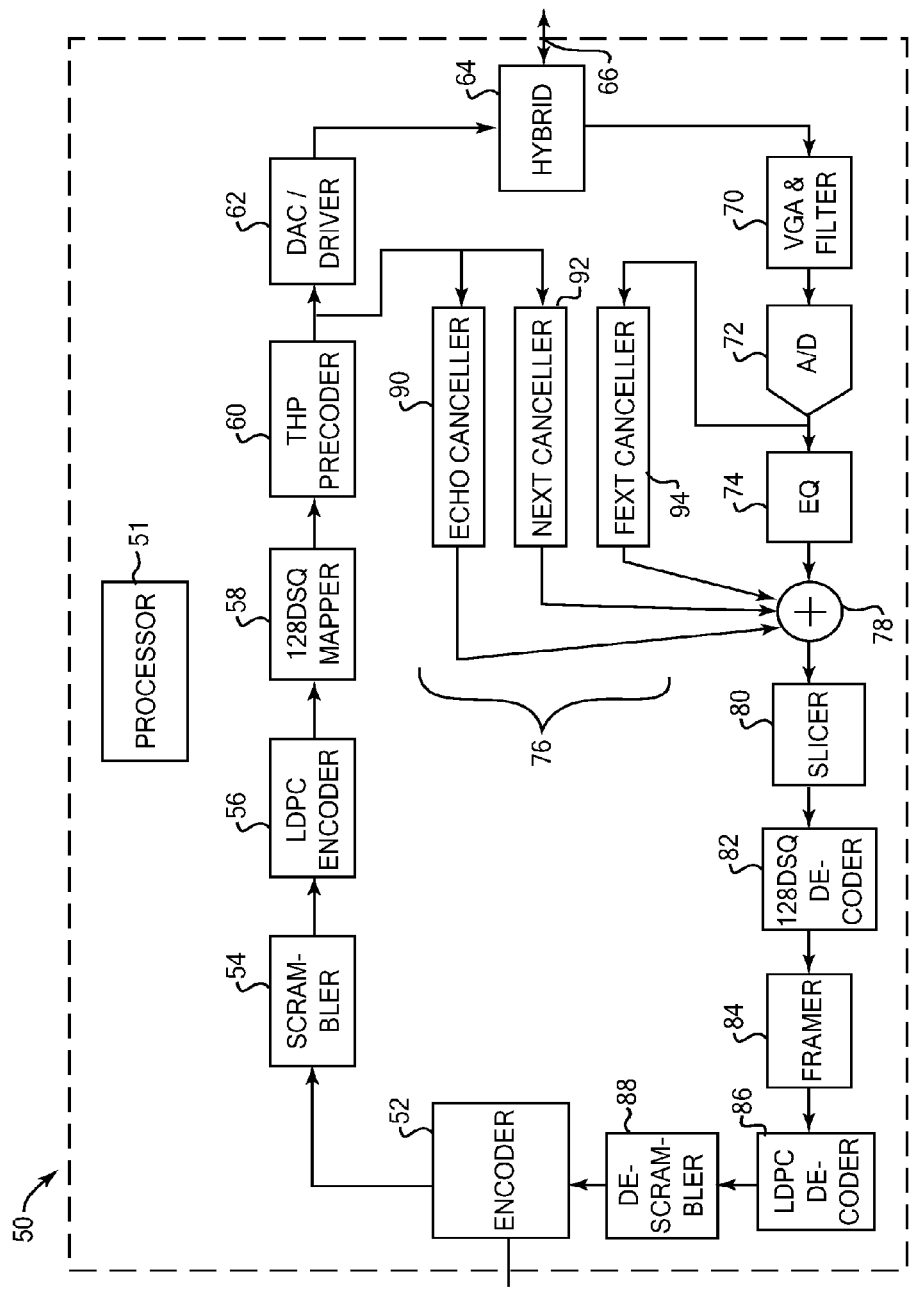
FIG. 2 is a block diagram illustrating one example of a transceiver suitable for use with embodiments of the present invention.

FIG. 2 is a block diagram illustrating one example of a transceiver 50 suitable for use with embodiments of the present invention. This example is suitable for a 10GBASE-T standard, but other different configurations and types of transceiver components can be used in other embodiments for 10GBASE-T or for other, different communication standards. For explanatory purposes, the example shown in FIG. 2 illustrates a single transmitter path/channel and a single receiver path/channel for data. Multiple such paths/channels are provided in embodiments having multiple channels, e.g. four of the transmitter paths and the receiver data paths shown in FIG. 2 are used in the 10GBASE-T standard, one path for each channel. All the channels and paths of the transceiver 150 can be implemented on a single integrated circuit chip in some embodiments.

One or more processors 51 are typically included in transceiver 50, or connected to the transceiver 50, to control various operations for the components of the transceiver, furthermore, additional hardware and/or software/firmware can be provided to implement the components themselves and can include processor functionality.

In the transmitter portion of the transceiver, an encoder 52 can be used to encode data desired to be transmitted in a particular desired format or standard, followed by a scrambler 54 for self-synchronized scrambling of the data to be transmitted, providing clock transitions, a statistically random power spectrum for EMI (electromagnetic interference) control, equalizer convergence, etc. A low density parity check (LDPC) encoder 56 encodes the data according to the parity check for error correction. A 128DSQ mapper 58 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 60 can then be used to adjust the transmitted signal to help the far-end receiver to equalize the signal when received at the link-partner. An analog front end (AFE) for the transmitter can include a digital-to-analog converter (DAC) and driver block 62 which converts the data to analog form for transmission and transmits the data via the hybrid coupler and transformer block 64 to the channel 66.

Different embodiments can implement the hybrid and transformer block 64 differently. For example, in some embodiments the transformers may be separately connected directly to the communication link, and the hybrid coupler is connected between the transformers and the rest of the transceiver components. Other embodiments may provide transformers between hybrid and the other transceiver components, or another configuration.

In a receiver portion of the transceiver 50, data is received at the hybrid coupler and transformer block 64. Four data communication channels are used in a 10GBASE-T embodiment (other amounts of channels can be used in other embodiments), and are sent to an analog front end (AFE) for the receiver which can include a variable gain amplifier (VGA) and filter 70 for filtering, and an analog-to-digital converter (A/D) 72. An equalizer block 74 can include one or more equalizers to remove intersymbol interference (ISI). The output of the equalizer block 74 is summed with the outputs of filters 76 (described below) at adder 78, and the output of the adder can be provided to a slicer 80 which can provide an average noise level in the received signal. The signal can then be provided to a DSQ128 decoder 82, which outputs decoded data to a framer 84 that extracts frames from the received data and provides the frames to an LDPC decoder 86 which error-corrects the data. The data can then be provided to a de-scrambler 88 which outputs de-scrambled data to the encoder 52 for provision to a connected computer system, processor, or other device.

The filters 76 are used to reduce echo and crosstalk (NEXT and FEXT) noise which may be introduced in the transmission and reception of data over one or more of the four communication channels. Filters 76 can include an Echo canceller 90, a Near End Crosstalk (NEXT) canceller 92, and a Far End Crosstalk (FEXT) canceller 94. The filters 76 cancel out the effect of signal echo and crosstalk from adjacent lines to achieve an acceptable bit error rate. The output of the THP precoder 160 in the transmitter portion of the transceiver 50 is provided to the Echo canceller 90 and the NEXT canceller 92, which calculate the values for cancellation of echo and NEXT and output these values to the adder 78. Similarly, the output of ADC 72 is provided to the FEXT canceller 94, which calculates the values for cancellation of FEXT and outputs the values to the adder 78. The digital values of echo and crosstalk calculated by the filter are subtracted from the incoming noisy analog data (digitized by ADC 72) by adder 78 to provide received data on each channel with reduced noise.

Out-of-Band Interference

In some instances of RF interference in a wireline communication system (e.g. a communication system using twisted pair wires for the channel(s)), the RF interference exists outside of the signaling bandwidth, i.e. at different frequencies than the bandwidth frequencies used to transmit the desired signal (such as a data signal) over the communication channel. This is known as out-of-band interference. If an RF interfering frequency is outside of the signaling bandwidth, then filtering in the signal path outside the signal bandwidth can block and/or attenuate the RFI from passing further into or through the receiver. For example, an out-of-band interference signal (interferer) can be blocked according to the present invention by proper filtering, such as low-pass filtering. An out-of-band RFI low pass filter of the present invention can be combined with one or more other filters that may be used on the receiver, or be implemented as a separate filter. Herein, the term "rejecting" of RF interference is intended to include rejection of part of the total interference present, i.e. reduction of the total RF interference, or can include complete rejection of all substantial RF interference.

Figure 3:
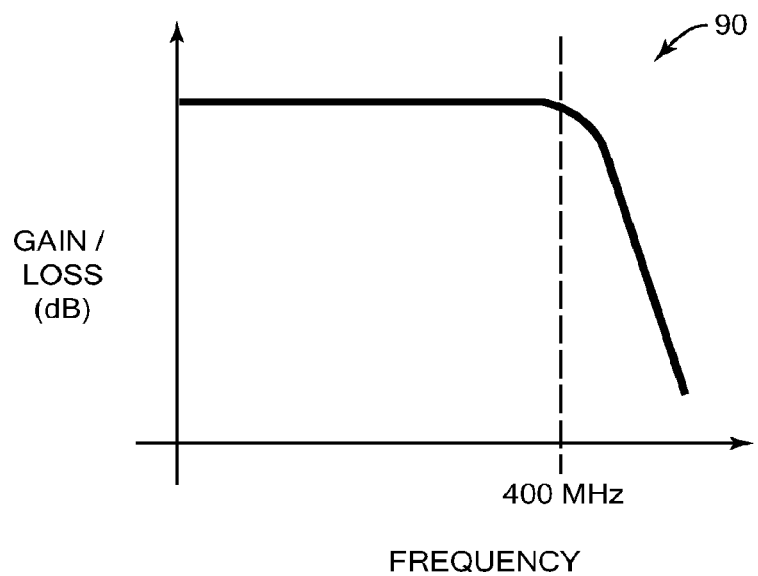
FIG. 3 is a diagrammatic illustration of a graph of a low-pass filter response.

For example, in a 10BASE-T communication system, the signaling bandwidth is from 0 to 400 MHz. A low pass filter with a rejection band above 400 MHz (e.g. corner frequency at 400 MHz) can block any out-of-band RFI, such as cell phone interference at 900 MHz. FIG. 3 shows an example graph 90 of a low-pass filter response with a corner frequency at 400 MHz. In some embodiments, to be effective from 400 MHz and above, the low-pass filter can have a fairly sharp low-pass transfer function, leading to a multi-pole filter of, for example, about 5 poles or more. In various embodiments, this multi-pole filter can be realized by active elements, by passive elements, or by a combination of the two. However, given the noise-sensitive nature of the analog front-end (AFE) of 10GBASE-T (including such components as, for example, a low pass filter, gain stage, and analog to digital converter (ADC) for the receiver path on the receiver), the use of too many active elements may result in unacceptable SNR degradation in particular implementations. Thus, in such embodiments most of the filtering effect can be achieved by passive elements like inductors and capacitors, e.g. an LC filter.

Many transceiver, such as 10GBASE-T transceivers or other types, are implemented on an integrated circuit chip (silicon chip or other material and/or substrate). Given that the size of the inductors required for filtering above 400 MHz is relatively large, these inductors may not easily fit on the chip used to implement such a transceiver Thus, in some embodiments the present invention uses off-chip elements to implement the out-of-band filter.

Figure 4A:
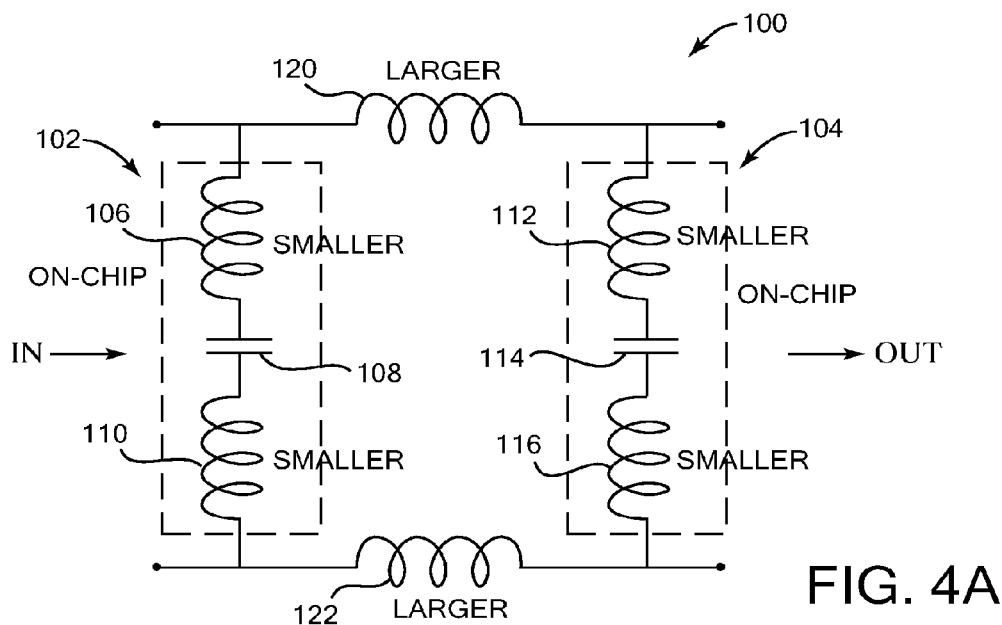
FIGS. 4A-4D are schematic diagrams illustrating four example embodiments of filter circuits suitable for filtering RF interference in a communication system.
Figure 4B:
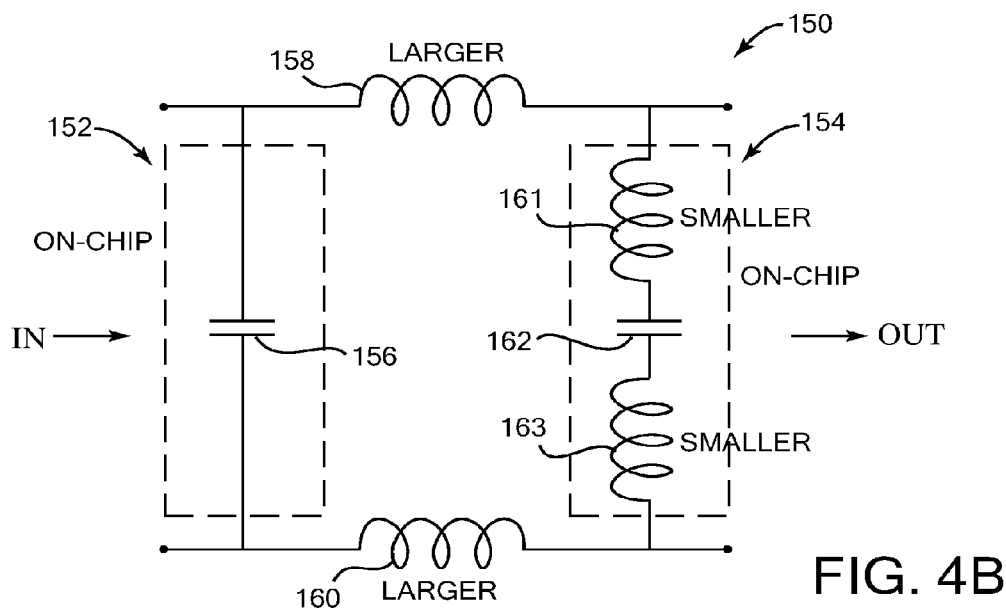

FIGS. 4A and 4B are schematic diagrams illustrating two example embodiments of circuits suitable for filtering RF interference (RFI) in a wireline communication system. FIGS. 4A and 4B show two example embodiments of the LC filter for a differential scheme. It should be noted that although the differential scheme is only presented here, these embodiments can be used in single-ended schemes as well.

In FIG. 4A, out-of-band RF filter 100 includes a group of elements 102 and a group of elements 104 that are all on-chip, i.e. on a chip, substrate, or similar device implementing a transceiver, such as transceiver 50 of FIG. 2. The on-chip group 102 includes a smaller inductor 106, a capacitor 108, and a smaller inductor 110, where the inductor 106 is connected to capacitor 108, which is in turn connected to inductor 110. A larger inductor 120, off-chip, is connected to the other terminal of the smaller inductor 106. The on-chip group 104 includes a smaller inductor 112, a capacitor 114, and a smaller inductor 116, where the inductor 112 is connected to the other terminal of the off-chip larger inductor 120 at one terminal and is connected to the capacitor 108 at its other terminal, and the capacitor 108 is in turn connected to inductor 110. An off-chip larger inductor 122 is connected between the on-chip inductor 110 and the on-chip inductor 116. Thus, only two larger inductors 120 and 122 of the filter 100 are located off-chip (but can be provided in the same package as the chip in some embodiments), and the rest of the filter components (capacitors and smaller inductors) are on the chip. In some examples, the larger inductors 120 and 122 can have an inductance in the range of 40 nH to 60 nH, the smaller inductors 106, 110, 112, and 116 can have an inductance in the range of 1 nH to 5 nH, and the capacitors 108 and 114 can have capacitances in the range of 0.1 fF to 20 pF.

FIG. 4B shows another embodiment of an out-of-band filter 150 which can be used to filter RF interference. As in the embodiment of FIG. 4A, two groups of elements are provided on the transceiver chip, a group 152 and a group 154. Unlike the group 102 of the filter 100 of FIG. 4A, group 152 includes only a capacitor 156, which is connected to the off-chip larger inductor 158 at one terminal and to the off-chip larger inductor 160 at its other terminal. On-chip group 154 includes a smaller inductor 161, a capacitor 162 and a smaller inductor 163, where the inductor 161 is connected to the off-chip larger inductor 158 at the opposite terminal of group 152 and to the capacitor 162 at its other terminal, the capacitor 162 is coupled to one terminal of the smaller inductor 163, and the inductor 163 is coupled at its other terminal to the off-chip larger inductor 160 at the opposite terminal of larger inductor 160 to the group 152. In one example, values for the components can be similar to those of filter 100 of FIG. 4A.

Figure 4C:
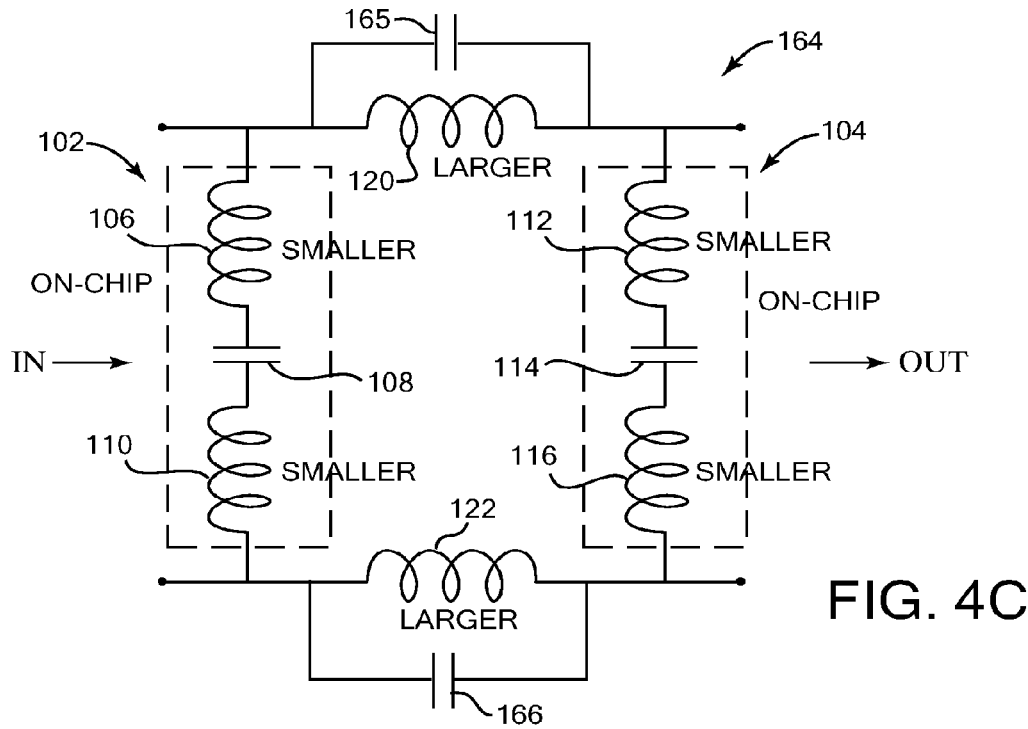
Figure 4D:
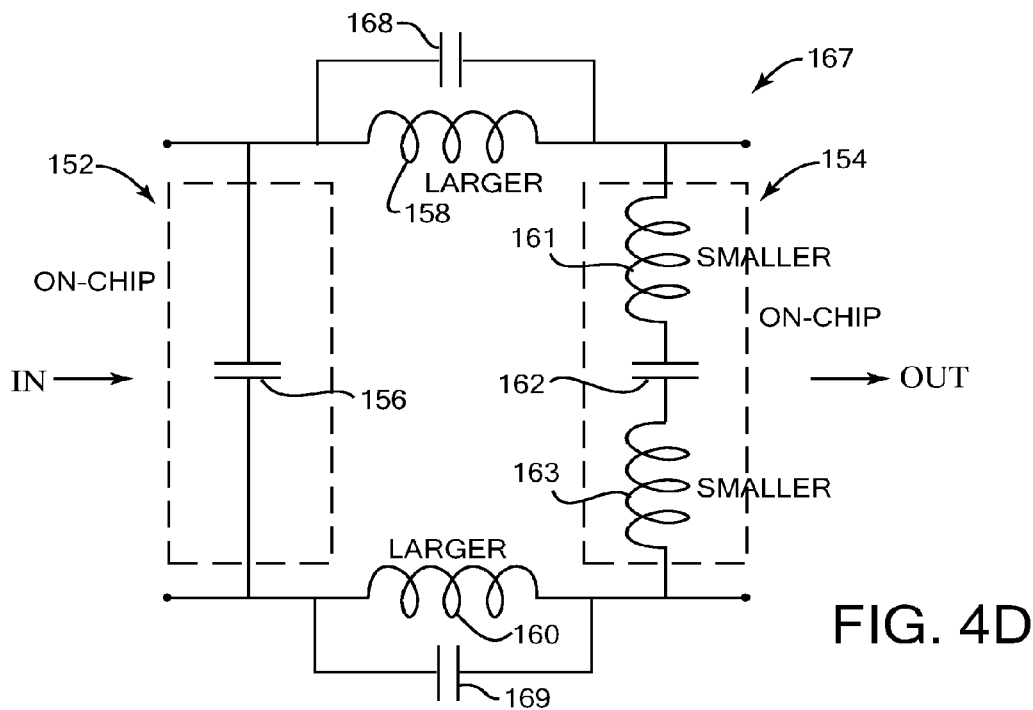

FIGS. 4C and 4D illustrate alternate embodiments of the out-of-band filters of FIGS. 4A and 4B, in which an additional capacitor is connected in parallel to the larger, off-chip inductors. Thus, in filter 164 of FIG. 4C, capacitor 165 is connected in parallel to inductor 120, and capacitor 166 is connected in parallel to inductor 122. Similarly, in filter 167 of FIG. 4D, capacitor 168 is connected in parallel to inductor 158, and capacitor 169 is connected in parallel to inductor 160. In some embodiments, these in-parallel capacitors can be located off-chip, e.g., provided on the same off-chip substrate as their in-parallel larger inductors.

One approach to implementing an off-chip LC filter is to position the filter between a transceiver chip (that includes both transmitter and receiver of the transceiver) and the communication channel. However, some communication systems such as 10GBASE-T use a full-duplex link, meaning both receive and transmit operations are on the same channel. For these systems, a drawback of positioning the LC filter between chip and channel is that not only would the received signal see the sharp low-pass filter, but the transmit signal from the on-chip transmitter would also see the sharp low-pass filter, which may have two negative effects. First, given a transmit spectrum that has relatively strong components above 400 MHz as in 10GBASE-T, the portion of the transmit power above 400 MHz that does not pass through the filter can reflect back and cause a large echo signal. Second, the filter reduces the total transmit power and thus, to meet a minimum power level (e.g., required by a standard such as IEEE), more power needs to be transmitted, resulting in more power dissipation and also more signal echo.

Figure 5:
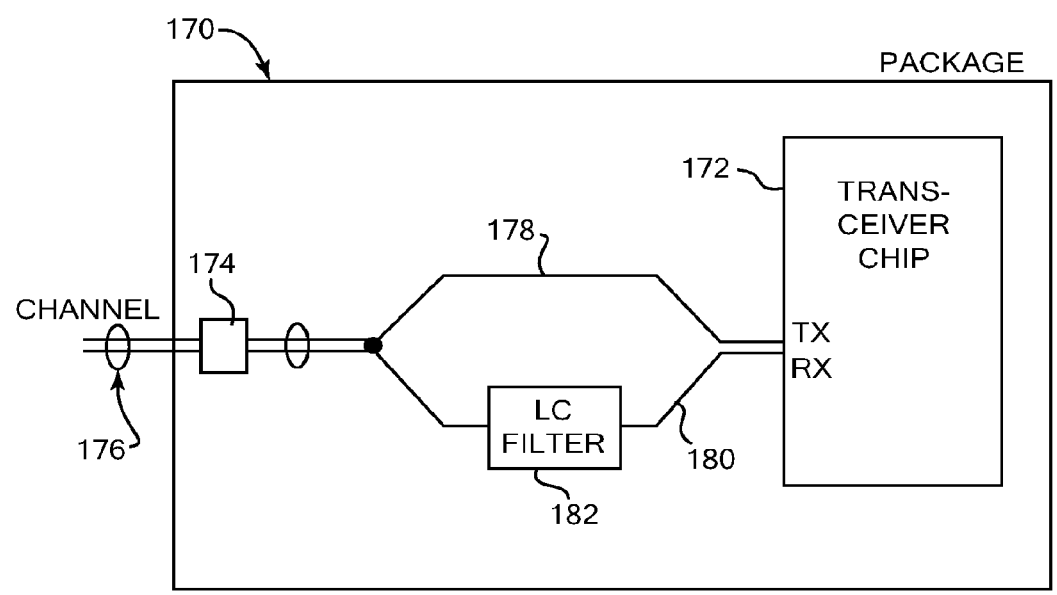
FIG. 5 is a diagrammatic illustration of a integrated circuit package implementing an out-of-band filter only on the receiver path of a transceiver.

To avoid these problems of filtering a transmitted signal, one embodiment of the present invention breaks the transmit and receive paths of the transceiver and places the out-of-band filter only on the receive path. FIG. 5 illustrates one example of such an embodiment implemented in an integrated circuit package. A package 170 is an integrated circuit package, such as a PHY (physical layer) integrated circuit, that includes one or more chips and other circuitry, as is appropriate for implementing a particular communication transceiver and related components. A transceiver chip 172 is included in the package 170, where the chip 172 includes at least a transmitter and a receiver as described above. Chip 172 has inputs and outputs which are connected to input/output pads on the package, allowing connections to other components outside the package. Connection pad 174 is one such input/output pad connected to chip 172, in which a communication channel 176 is also connected to the pad 174 (other, additional components can be located between pad 174 and channel 176 in some embodiments). In a system such as 10GBASE-T, the transmitter and receiver signals are provided on a single channel, and so the transmitter and receiver of transceiver chip 172 are desired to both be connected to a single pad 174. To allow a single pad to be used and to prevent the transmitter signals from passing through the LC filter of the present invention, this embodiment breaks the transmitter and receiver paths to provide a transmitter path 178 and a receiver path 180. An LC filter 182 of the present invention is connected only in the receiver path 180. The broken paths are rejoined at the pad 174 but are kept separate and are not joined at or before the chip 172, such that the filter output connects to receiver input RX and the separate transmitter path connects to the transmit output TX of the chip. The LC filter 182 can be located or mounted to the same package 170 as the transceiver chip 172, and the separate paths allows a single pad 174 to be used for input and output on the channel.

In some embodiments, all the components of the LC filter can be placed in the LC filter block 182 on the package. In other embodiments, a portion of the components of the LC filter can be provided on the transceiver chip 172 (and/or other components in the package 170) and a different portion is provided in filter block 182. For example, if implementing relative large capacitors and smaller inductors on a chip is practical, in some embodiments only the relatively large inductors of the LC filter are placed off-chip in block 182 on the package, while to save the component count on the package, the remaining components of the filter are implemented on transceiver chip 172. Other configurations can also be used, such as using additional blocks 182, or using additional chips, and/or putting additional components in block 182. In some embodiments, the block 182 can itself be another integrated circuit chip that includes all or most of the filter components, which in some embodiments is advantageous to limit the number of off-chip components in the package 170. In some alternate embodiments, the transceiver can be implemented on two or more chips, and the large inductors can be placed off of these transceiver chips.

In some embodiments, the components provided on the package 170 and off of the chip 172 can be implemented using standard discrete passive components, as described above. In other embodiments, one or more off-chip filter components can be implemented using conductive traces or connections provided on a package substrate, such as a portion of a printed circuit board (PCB), or a different type of substrate or material. For example, to implement an inductor, spirals of copper lines (or other conductive traces) can be provided as conductive traces etched or otherwise provided on the surface of a substrate. To implement a capacitor, conductive traces can be provided on different layers of a substrate to provide the desired capacitance. Such conductive trace components on a package PCB can reduce the cost of providing the LC filter components in some embodiments.

In other embodiments, the transmitter and receiver paths can be similarly broken into separate paths external to the chip, where the LC filter 182 is provided only on the receiver path, and the transmitter and receiver paths are not rejoined at the pad 174. Rather, the separate paths can be connected to separate input or output pads provided on the package.

In-Band Interference

In some communication systems, in-band RFI may be mixed with the desired far-end signal, i.e., RF interference may be present at a range of frequencies within the bandwidth of the desired data signal. This can present a more difficult filtering problem than out-of-band interference, since the interference cannot simply be filtered as that would also filter some or all of the desired data signal.

In order to impact the desired signal minimally, any filtering to reject the in-band RFI should be strictly limited to the bandwidth of the RFI. For example, an in-band interferer can be blocked or reduced by proper notch filtering. In one example, a very narrow notch filter centered at the RFI frequency can be used to block or attenuate the RFI signal for a small subset of frequencies in the operating signal bandwidth of the communication system.

Figure 6:
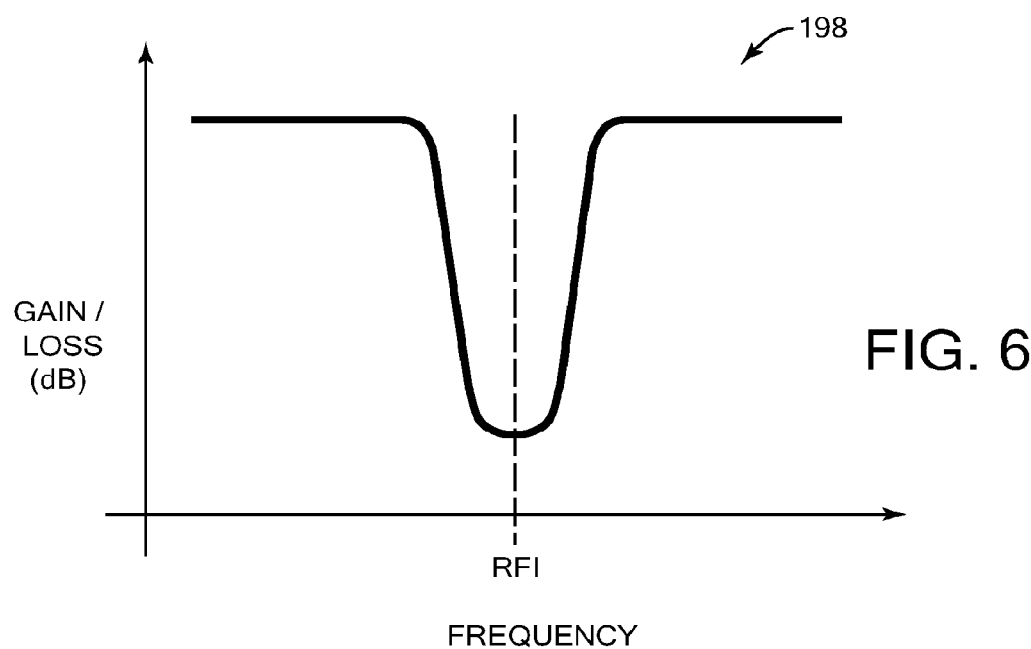
FIG. 6 is a diagrammatic illustration of a graph of a notch filter response centered at an RFI frequency.

FIG. 6 shows one example graph 198 of a notch filter response centered at the RFI frequency. The gain is flat at the left of the graph, then as frequency increases close to the RFI frequency the gain drops to a level very small, then quickly rises and returns to the flat level it was at previously. In one example, if the gain is 0 db outside the filtered band, the gain may drop to a low level such as −50 dB or other very small gain (or loss). Since RFI typically exists only at a very narrow frequency range, e.g. it may be close to a pure sine wave or other type of wave, only a very narrow notch filter is typically required to filter a single RFI frequency or a small subset of frequencies within the operating signal bandwidth of the transceiver. In other cases, a larger bandwidth interference may be present, and a wider notch filter can be used to filter the larger bandwidth.

The notch filter can be implemented in a variety of ways. In some embodiments, the signal path of a receiver includes one or more equalizing filters to correct for inter-symbol interference (ISI). For example, a feed forward equalizer (FFE) may be used in the equalizer block 174 in 10GBASE-T embodiments, as described above with reference to FIG. 2. In some of these embodiments, the notch filter can be implemented within that equalizer filter. In other embodiments, the notch filter can be implemented separately in the receiver path.

Using the notch filter presents a potential problem in that it may reject or attenuate not only the RFI noise but also one or more expected (desired) signal components of the desired far-end signal that is mixed with the RFI within the filtered narrow subset of frequencies (the far-end signal is referred to as a "desired signal" herein, which can include any signal desired to be transmitted and received, e.g. a data signal providing data). Even with a very narrow notch filter, the impact on the desired signal may not be negligible. This is particularly true when the desired signal is powerful or has signal components that are powerful at the RFI frequency. In such cases, the notch filter not only blocks considerable amount of desired signal power but it also introduces a significant amount of inter-symbol interference. These two effects can reduce the overall signal-to-noise ratio of the receiver and consequently cause a drop in performance.

According to the present invention, one embodiment for compensating for this loss of signal and performance is to provide a boost in power or amplitude of the signal content of the far-end desired signal at the RFI frequency(ies), i.e. provide a "boost block" or "boost filter" in the transmitter to provide a boost to the desired signal at the proper frequencies. The boost can be approximately equivalent in power to the loss in power of the desired signal created by the notch filter at the receiver. This creates a gain in the transmitter path only at particular frequencies in the bandwidth of the signal. Thus, for example, if the notch filter attenuates a component of a desired signal that is at a particular frequency by one tenth its power or amplitude, then the boost block can boost the signal component amplitude at the transmitter by approximately a multiple of 10 at that same particular frequency. Thus, once the signal was boosted at the transmitter and then attenuated at the receiver, the overall gain added would be about 0 dB.

In some embodiments, the boost block can be implemented within a precoder in the transmitter and by using pre-coding in the transmitter path. For example, the 10GBASE-T communication standard has provisioned the use of a Tomlinson-Harashima precoder (THP) 60 in the transmitter path as described above with reference to FIG. 2. According to an aspect of the present invention, this precoder 60 can also be utilized effectively in boosting the power of the transmit signal components at RFI frequencies, if needed. A boost using the precoder 60 combined with a notch filter at the receiver signal path (e.g. using an equalizer in equalizer block 74) can effectively reject the RFI without significant impact on the overall desired signal or receiver performance. The precoder and equalizer combination thus helps reduce ISI as well as the RFI described by the present invention.

There are many ways to implement a receiver notch filter and transmitter boost block at the RFI frequency. In one embodiment using a parametric approach, the frequency and the bandwidth of the RFI noise can be estimated and then the parameters of programmable filters optimized for proper rejection and boost by setting the parameters at the determined frequency and bandwidth. Thus, a programmable notch filter in the receiver path can be programmed to filter/reject the signal by a particular power level and at one or more determined frequencies (or frequency bands) at which the RFI was determined to be present, and a programmable boost block in the transmitter path can be programmed to boost the power of signal components at the determined RFI frequency(ies) at an appropriate gain to compensate for the notch filter.

Typically in receivers such as in transceiver 50 of FIG. 2, a training procedure allows filters of the transceiver to be adapted to conditions of the communication channel, including noise. The training procedure determines parameters of noise on the channel and then adjusts coefficients of filters, such as echo, NEXT, and FEXT cancellers, to adapt these filters to the noise. Such cancellers are adapted to cancel known crosstalk noise from other channels, and known echo noise. According to embodiments of the present inventions, system components can be similarly adapted to reject RFI interference. For example, parameters of RFI interference can be determined and coefficients or characteristics of the notch filter and/or boost block can be adapted to that RFI interference in the training mode. For example, in embodiments using a precoder for providing the frequency boost and an equalizer for performing the notch filtering, the parameters or coefficients for precoder and equalizer can be determined.

In some embodiments, a cost function may be minimized to jointly train or adapt the parameters of the notch filter and boost block. For example, in a training or retraining mode of the communication system that can be performed, the transmitted signal to be received is known or easily estimated by the receiver, so that the actual received signal can be subtracted from the expected received signal to obtain an error signal caused by noise, including RFI interference. The power of the error signal may be the cost function needed to be minimized. Examples of cost function techniques are minimum mean-square error (MMSE) and least mean-square (LMS). For MMSE, the technique obtains the error signal, finds the average of the square of the error, and then minimizes the result. For LMS, the power or average magnitude of the error signal is also minimized.

In some embodiments, the training procedure will obtain an error signal that may have contributions from several different types of noise. Such types include ISI, NEXT, FEXT, echo, RFI, and background noise. During a training procedure, the receiver can determine how much of the error signal is contributed from the local transmitter causing noise from echo and NEXT, since the transmitted signal is known. The receiver can also determine how much of the error signal is contributed from the far-end (link partner) transmitter and other channels causing ISI and FEXT. The remaining noise is caused from external sources (external to the channels of the transceiver), including RFI. Thus the notch filter and boost block characteristics can be based on this remaining noise. For example, if the remaining noise has a large component in a single frequency, then it can be assumed that RFI is a large part of that noise, and the notch filter and boost block can be adapted to that frequency.

In some embodiments, a notch filter alone may function effectively enough so as to omit the use of a boost block in the transmitter. For example, if RFI has a small amplitude, then a notch filter can filter out most of the RFI without reducing the amplitude of the desired signal to a degree that the desired signal is lost or unreliable. However, in many cases the RFI is of a sufficiently high power that a boost block is required.

In some embodiments, the use of a FEXT canceller in the communication path can additionally reduce RFI, such as FEXT canceller 94 shown in FIG. 2. For example, a FEXT canceller receives a desired signal on one channel while canceling the effects of crosstalk noise caused by transmissions on other channels of the cable (such as other twisted pair channels). The FEXT canceller is adapted during a training mode to cancel crosstalk noise on the desired signal channel. Later, during actual operation, RFI may also be present, and the FFXT canceller can then adapt during actual operation to also cancel RFI as well as the crosstalk noise. This ability for the FEXT canceller to cancel RFI noise generally is only suitable when the relative power of RF interference with respect to all other signal and noise sources is small at the input of FEXT canceller. A FEXT canceller used to cancel RFI noise should be complex enough to be able to adapt to become a narrow band low pass filter that can cancel the RFI noise.

Figure 7:
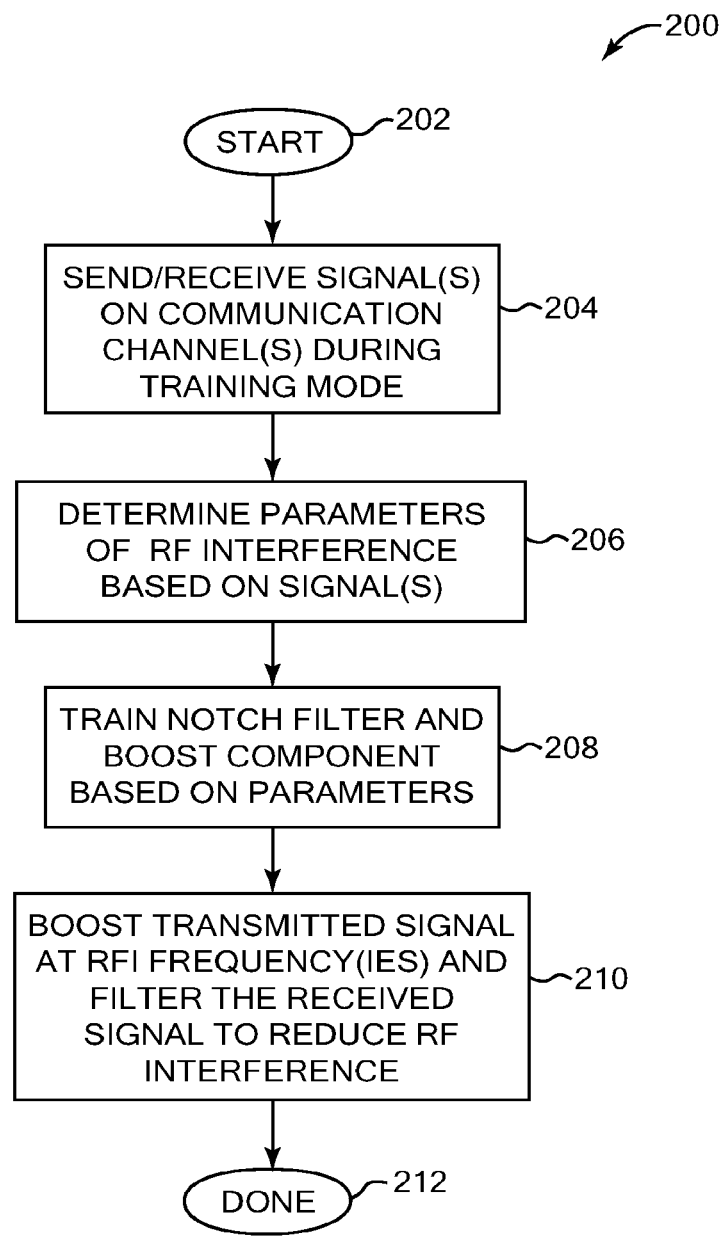
FIG. 7 is a flow diagram illustrating one embodiment of a method of the present invention for rejecting in-band RF interference for a receiver in a communication system.

FIG. 7 is a flow diagram illustrating one embodiment of a method 200 of the present invention for rejecting in-band RF interference for a receiver in a communication system. For explanatory purposes, the method describes a transmitter and a link partner receiver connected over a communication network. Method 200 can be implemented by one or more processors provided in link partner transceivers or connected to the link partner transceivers (such as in a connected computer system or electronic device), and can be implemented using hardware, software, or both hardware and software. The method can be implemented using a computer program product accessible from a computer readable medium providing program instructions or code for use by or implemented by a computer system or processor. A computer readable medium can be any apparatus that can contain, store, communicate, propagate, or transport the program for use by or in connection with the processor or computer system. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk (CD-ROM, DVD, etc.).

The method begins at 202, and in step 204, signals are transmitted and received on communication channel(s) by the link partners during a training mode. The training mode, as explained above, allows filters of the transceivers to be adapted and trained to accommodate noise on the communication channel. In the present invention, this training includes adapting the notch filter and the boost block, which can be, for example, a precoder and FFE, as explained above. In step 206, parameters are determined for the RF interference based on the signal(s). In one example as described above, the RFI can be determined from the noise after other types of noise have been determined in the signal from known noise sources. RFI parameters can include the frequency and amplitude of the RFI. In step 208, the notch filter and the boost block are trained based on the determined parameters. The notch filter and boost block are adjusted so that they are tuned to the determined RFI. For example, coefficients can be adjusted in a precoder for the boost block and in an FFE for the notch filter. In another example, the coefficients of the filters are properly adapted to the all sources of noise including RFI using algorithms such as MMSE or LMS. In step 210, the link partner transmitter and receiver provide the RFI cancellation by boosting the transmitted desired signal at the transmitter with the boost block at the RFI frequency(ies), and filtering the received signal at the link partner receiver using the notch filter to filter out the RFI, which reduces the boosted desired signal back to a standard amplitude. The process is then complete at 212.

The embodiments of the present invention provide significant advantages in rejecting RF interference for transceivers on a communication network. Out-of-band and in-band RFI can be rejected using different embodiments of the invention, allowing more accurate and reliable operation of the transceivers.

Although the present invention has been described in accordance with the embodiments shown, one of ordinary skill in the art will readily recognize that there could be variations to the embodiments and those variations would be within the spirit and scope of the present invention. For example, other network standards can be used with the embodiments shown where similar requirements are applicable. Accordingly, many modifications may be made by one of ordinary skill in the art without departing from the spirit and scope of the appended claims.

What is claimed is:

1. A semiconductor device comprising:
   an Ethernet transceiver integrated circuit (IC) chip;
   a chip package including multiple pads for coupling to a wireline Ethernet link comprising multiple full-duplex twisted-pair channels, the IC chip mounted within the chip package;
   multiple RFI filters corresponding to the multiple full-duplex twisted-pair channels to filter interfering signals received via the multiple full-duplex twisted-pair channels, wherein each of the RFI filters is external to the Ethernet transceiver IC chip and disposed in the chip package;
   wherein the transceiver IC chip includes multiple transmitters having outputs coupled to respective input/output (I/O) pads, and multiple receivers having inputs coupled to the corresponding I/O pads;
   wherein the package includes off-chip transmit signal paths coupled to the I/O pads, and off-chip receive signal paths coupled to the I/O pads; and
   wherein each RFI filter is disposed entirely in a corresponding off-chip receive signal path to filter the RFI from signals received via the multiple twisted-pair channels.

2. The semiconductor device according to claim 1, wherein each RFI filter includes one or more passive components.

3. The semiconductor device according to claim 1, wherein each RFI filter comprises an inductor.

4. The semiconductor device according to claim 3, wherein the inductor exhibits an inductance in the range of 40 nH to 60 nH.

5. The semiconductor device according to claim 1, wherein each RFI filter is positioned between the Ethernet transceiver IC chip and a corresponding twisted-pair channel.

6. The semiconductor device according to claim 1, wherein:
   the package includes a substrate, the substrate formed with a dielectric layer and a conductive trace that forms multiple inductors, the inductors employed by the RFI filters.

7. A transceiver system comprising:
   a chip package including a substrate formed with contact pads for coupling to multiple wireline communication channels comprising full-duplex twisted pair channels;
   an Ethernet transceiver IC chip mounted on the substrate and disposed in the chip package, the Ethernet transceiver IC chip including pairs of transmit and receive components, each pair of transmit and receive components coupled to a contact pad on the substrate;
   RFI filter circuitry comprising multiple RFI filters that correspond to the twisted pair channels, the RFI filter circuitry disposed in the chip package and external to the Ethernet transceiver IC chip, the RFI filter circuitry forming at least a portion of an out of band filter;
   wherein each pair of transmit and receive components couple to a common contact on the IC chip, and wherein the substrate is formed with separate off-chip transmit and receive paths for coupling each common contact to a substrate pad, and wherein each filter is disposed solely in a corresponding off-chip receive path.

8. The transceiver system of claim 7, wherein the filter circuitry includes at least one inductor formed as a spiral trace in the substrate.

9. A semiconductor device comprising:
   an Ethernet transceiver integrated circuit (IC) chip;
   a chip package including multiple pads for coupling to a wireline Ethernet link comprising multiple full-duplex twisted-pair channels, the IC chip mounted within the chip package; and
   means for filtering out-of-band radio frequency interference (RFI) acting on signals received via the multiple twisted-pair channels, wherein at least a portion of the means for filtering is external to the IC chip and disposed in the chip package;
   wherein the transceiver IC chip includes multiple transmitters having outputs coupled to respective input/output (I/O) pads, and multiple receivers having inputs coupled to the corresponding I/O pads;
   wherein the package includes off-chip transmit signal paths coupled to the I/O pads, and off-chip receive signal paths coupled to the I/O pads; and
   wherein the means for filtering is disposed entirely in the off-chip receive signal paths to filter the RFI from signals received via the multiple twisted-pair channels.

* * * * *